(12) United States Patent
Stanjek et al.

(10) Patent No.: US 11,643,557 B2
(45) Date of Patent: May 9, 2023

(54) COATING COMPOSITION FOR SEALING SURFACES

(71) Applicants: WACKER CHEMIE AG, Munich (DE); BASF SE, Ludwigshafen (DE)

(72) Inventors: Volker Stanjek, Ampfing (DE); Andreas Bauer, Kirchdorf (DE); Michael Wandinger, Burghausen (DE); Bernd Hoevel, Sinzheim (DE); Angelika Roser, Mannheim (DE)

(73) Assignees: WACKER CHEMIE AG, Munich (DE); BASF SE, Ludwigshafen (DE)

( * ) Notice: Subject to any disclaimer, the term of this patent is extended or adjusted under 35 U.S.C. 154(b) by 397 days.

(21) Appl. No.: 16/954,036

(22) PCT Filed: Dec. 15, 2017

(86) PCT No.: PCT/EP2017/083103
§ 371 (c)(1),
(2) Date: Jun. 15, 2020

(87) PCT Pub. No.: WO2019/114990
PCT Pub. Date: Jun. 20, 2019

(65) Prior Publication Data
US 2021/0079235 A1 Mar. 18, 2021

(51) Int. Cl.
C09D 7/63 (2018.01)
C08K 5/3432 (2006.01)
C09D 183/04 (2006.01)

(52) U.S. Cl.
CPC ............. *C09D 7/63* (2018.01); *C08K 5/3432* (2013.01); *C09D 183/04* (2013.01)

(58) Field of Classification Search
CPC .................................................. C09J 183/00
See application file for complete search history.

(56) References Cited

U.S. PATENT DOCUMENTS

| | | |
|---|---|---|
| 6,884,852 B1 | 4/2005 | Klauck et al. |
| 2005/0119436 A1 | 6/2005 | Ziche et al. |
| 2007/0167598 A1 | 7/2007 | Stanjek et al. |
| 2009/0124751 A1 | 5/2009 | Lucas et al. |
| 2010/0016537 A1 | 1/2010 | Bamann et al. |
| 2010/0087576 A1 | 4/2010 | Prasse |
| 2011/0236586 A1 | 9/2011 | Bauer et al. |
| 2013/0029037 A1 | 1/2013 | Stanjek et al. |
| 2015/0203729 A1* | 7/2015 | Stanjek ............ C08L 83/04 156/329 |
| 2018/0282518 A1 | 10/2018 | Ogawa et al. |

FOREIGN PATENT DOCUMENTS

| | | |
|---|---|---|
| DE | 102008043825 A1 | 5/2010 |
| EP | 1093482 B1 | 8/2004 |
| EP | 1641854 B1 | 1/2007 |
| EP | 1535940 B1 | 6/2007 |
| EP | 1987108 B1 | 9/2009 |
| EP | 1896523 B1 | 10/2010 |
| EP | 2352776 B1 | 1/2014 |
| EP | 2561024 B1 | 5/2016 |
| JP | 2010090381 A | 4/2010 |
| JP | 2014510816 A | 5/2014 |
| KR | 20150031479 A | 3/2015 |
| WO | 2007093382 A1 | 8/2007 |
| WO | 2010057796 A1 | 5/2010 |
| WO | 2011131506 A1 | 10/2011 |
| WO | 2012135443 A1 | 10/2012 |
| WO | 2017099154 A1 | 6/2017 |

* cited by examiner

*Primary Examiner* — Khanh T Nguyen
(74) *Attorney, Agent, or Firm* — Brooks Kushman P.C.

(57) ABSTRACT

Curable alkoxysilyl-terminated polymers may be used for architectural coatings, particularly flat roofs, if specific HALS UV absorbants are included in the coating formulation.

14 Claims, No Drawings

COATING COMPOSITION FOR SEALING SURFACES

CROSS REFERENCE TO RELATED APPLICATIONS

This application is the U.S. National Phase of PCT Appln. No. PCT/EP2017/083103 filed Dec. 15, 2017, the disclosure of which is incorporated in its entirety by reference herein.

BACKGROUND OF THE INVENTION

1. Field of the Invention

The invention relates to a process for sealing surfaces and also to moisture-curing coating compositions which can be used for this purpose and are based on silane-crosslinking prepolymers. The invention relates more particularly to a process for sealing exterior building surfaces, roofs, and the like.

2. Description of the Related Art

It is massively important to seal organic and inorganic building materials such as wood or concrete internally and externally, on buildings or on the roof, against the penetration of water, in order to prevent destruction of the building substance or else the penetration of water into the interior of the building.

On complex roofs with copious detailing, many sealing materials frequently used in the past, such as bitumen sheets, have almost entirely disappeared, on account of the very great difficulty of sealing angles and edges when using such sheets. This problem was subsequently solved by the use of molten bitumen, but only at the expense of other hazards for the operator, such as the inhalation of toxic vapors and also operation with very hot liquids. VOC limitations and toxicological considerations have seen other solutions formerly in use, such as solventborne bitumen systems, being replaced by different technologies.

Nowadays, water-based coating materials such as acrylate-modified or polymer-modified bitumen emulsions are used primarily in roof sealing, although one-component and two-component polyurethane systems as well continue to play a significant part.

A major disadvantage of aqueous emulsions is the physical drying of the materials, which takes a very long time especially below a temperature of 15° C. Conversely, drying at the surface becomes comparatively quick above 25° C., with the associated possibility of inclusions of water and, subsequently, formation of bubbles. In this way, weaker points are formed in the coating, and can lead to leaks.

One-component, polyurethane-based sealing systems commonly contain large amounts of solvent, in order to lower the viscosity to an acceptable level for brush application or roll application in the roof region. Two-component polyurethane systems, by comparison, are very expensive and necessitate a complicated application technology. All polyurethane sealing systems contain highly toxic isocyanate compounds, whose use is viewed critically in virtually all home applications, though also in numerous professional applications.

RTV-1 silicone coating formulations such as acetate systems or oxime systems give off elimination products, when curing, that have a foul odor or even are harmful to health, such as acetic acid or oxime, for example. Other disadvantages of these materials are the poor adhesion to a large number of building materials, the poor recoatability, and the inadequate weathering stability.

One decidedly advantageous technology is built on one-component, moisture-curing coating materials based on silane-terminated polymers. Besides very good mechanical properties, corresponding products are notable for effective workability, rapid and complete curing, and their toxicological unobjectionability. Materials based on this technology, and their use as sealing materials for roof coatings, are known from EP-A 1 987 108, EP-A 2 352 776 and EP-A 2 561 024, for example.

Particularly advantageous in this context are mixtures which as well as the silane-terminated polymers also include relatively large amounts of a reactive diluent. The advantage of such mixtures lies firstly in their low viscosity and correspondingly effective workability, and secondly in the fact that in the course of the curing process, the reactive diluent is also incorporated into the network that forms, and therefore neither represents nor remains as an uncrosslinked and hence plasticizing component in the cured material.

Nevertheless, all silane-crosslinking polymers used to date in roof coatings have the disadvantage of possessing a backbone which is composed wholly or at least in large part of polyethers, more particularly of polypropylene glycols. Polyethers, however, are unstable to oxidation and under UV irradiation they tend to form peroxides; in subsequent degradation reactions, the peroxides formed may damage the polymer network or even destroy it completely. Accordingly, the corresponding coatings are comparatively UV-unstable. This, of course, is a major problem especially for roof coatings, which even in temperate latitudes are subject to a high UV load.

One common approach to solving the problem of deficient UV resistance is to use radical scavengers, and more particularly to employ what are known as HALS products (hindered amine light stabilizers); in many cases, particularly good results are obtained if the HALS radical scavengers are employed in combination with UV absorbers and/or antioxidants.

In many cases, particularly good outcomes are achieved with HALS stabilizers. A particular reason for this is that, in contrast to conventional radical scavengers or else antioxidants, these HALS stabilizers are able to fulfil their function without being consumed in the process. Thus their reaction with radicals and/or peroxides is not irreversible; instead, they are continually regenerated via follow-on reactions—the skilled person knows this reaction sequence as the Denisov cycle.

In many systems, this breakdown mechanism for radicals that does not involve consumption of the HALS stabilizers means that the protective effect achievable with HALS stabilizers is good and, above all, long-lasting.

However, in contrast to many other systems, the usual HALS stabilizers display only a comparatively poor protective effect in the above-described roof coatings based on silane-terminated polymers. Even after brief weathering, such coatings show distinct damage, which on continuing UV exposure can lead almost always to complete destruction of the coating. It seems to be obvious that conventional HALS stabilizers are not in a position to endow roof coatings based on silane-terminated polymers with a long-lasting weathering resistance.

Nor to date was this achieved using other—generally even less effective—types of stabilizer, such as, for example, antioxidants or else radical scavengers which are consumed in fulfilling their function.

US 2009/0124751 A1 describes moisture-crosslinkable compositions, especially adhesives, which as well as sily-lated resin may optionally comprise UV stabilizers.

DE 10 2008 043 825 describes a method for sealing surfaces which uses a moisture-crosslinkable composition which may optionally comprise light stabilizers.

Accordingly, the object was that of finding a composition based on silane-terminated polymers for sealing surfaces, especially roofs, which in this application exhibits significantly improved and in particular long-lasting weathering resistance.

SUMMARY OF THE INVENTION

A subject of the invention are moisture-curing coating compositions (BS) comprising
(A) at least one compound of the formula $$Y-[(CR^1_2)_b-SiR_a(OR^2)_{3-a}]_x \qquad (I),$$

where
Y denotes an x-valent polymer radical bonded via nitrogen, oxygen, sulfur or carbon,
R may be identical or different and represents a monovalent, optionally substituted, SiC-bonded hydrocarbon radical,
$R^1$ may be identical or different and represents hydrogen atom or a monovalent, optionally substituted hydrocarbon radical which may be attached to the carbon atom via nitrogen, phosphorus, oxygen, sulfur, or carbonyl group,
$R^2$ may be identical or different and denotes hydrogen atom or a monovalent, optionally substituted hydrocarbon radical,
x is an integer from 1 to 10, preferably 1, 2 or 3, more preferably 1 or 2,
a may be identical or different and is 0, 1 or 2, preferably 0 or 1, and
b may be identical or different and is an integer from 1 to 10, preferably 1, 3 or 4, more preferably 1 or 3, more particularly 1,
(B) one or more HALS stabilizers, which are selected from
(B1) mixtures of different organic compounds which per molecule have at least one functional group of the formula

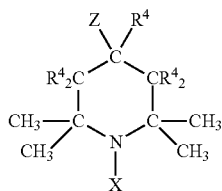

(II)

with the proviso that the organic compounds contained in this mixture contain per molecule on average more than two functional groups of the formula (II),
(B2) organic compounds having at least three functional groups of the formula (II), and
(B3) organic compounds having at least three functional groups selected from functional groups of the formula (II) and optionally substituted hydroxyphenyl groups,
where
X represents an N-bonded, monovalent radical $R^3$, a radical $-OR^3$, a radical $-C(=O)R^3$ or a chemical bond to further structural elements of the stabilizer molecule,
Z represents hydrogen atom, a radical $-OR^{13}$ or a group $NR^{13}_2$,
$R^3$ may be identical or different and represents a hydrogen atom or a monovalent, optionally substituted hydrocarbon radical which may be interrupted by oxygen atoms, ester groups or amine groups,
$R^{13}$ may be identical or different and has a definition as indicated for $R^3$ or represents a chemical bond to further structural elements of the stabilizer molecule, and
$R^4$ may be identical or different and represents a hydrogen atom or a monovalent, optionally substituted hydrocarbon radical, with the proviso that at least one of the radicals X or $R^{13}$ in formula (II) represents a chemical bond to further structural elements of the stabilizer molecule.

DETAILED DESCRIPTION OF THE PREFERRED EMBODIMENTS

The invention is based on the surprising discovery that the materials of the invention are able to ensure significantly improved and in particular much longer-lived UV protection than conventional materials with HALS stabilizers which per molecule possess not more than two functional groups selected from the formula (II) and optionally unsubstituted hydroxyphenyl groups.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical, isooctyl radicals, and the 2,2,4-trimethylpentyl radical and nonyl radicals such as the n-nonyl radical; decyl radicals such as the n-decyl radical; dodecyl radicals, such as the n-dodecyl radical; octadecyl radicals such as the n-octadecyl radical; cycloalkyl radicals such as the cyclopentyl, cyclohexyl, cycloheptyl radical and methylcyclohexyl radicals; alkenyl radicals such as the vinyl, 1-propenyl and the 2-propenyl radicals; aryl radicals such as the phenyl, naphthyl, anthryl and phenanthryl radicals; alkaryl radicals such as the o-, m-, and p-tolyl radicals xylyl radicals, and ethylphenyl radicals; and aralkyl radicals such as the benzyl radical, and the α- and the β-phenylethyl radical.

Examples of substituted radicals R are haloalkyl radicals such as the 3,3,3-trifluoro-n-propyl radical, the 2,2,2,2',2', 2'-hexafluoroisopropyl radical and the heptafluoroisopropyl radical, and haloaryl radicals, such as the o-, m- and p-chlorophenyl radicals.

Radical R preferably comprises monovalent hydrocarbon radicals having 1 to 6 carbon atoms and being optionally substituted by halogen atoms and more preferably comprises alkyl radicals having 1 or 2 carbon atoms, more particularly the methyl radical.

Examples of radicals $R^1$ are hydrogen, the radicals indicated for R, and also optionally substituted hydrocarbon radicals bonded to the carbon atom via nitrogen, phosphorus, oxygen, sulfur, carbon, or a carbonyl group.

Radical $R^1$ preferably comprises hydrogen or hydrocarbon radicals having 1 to 20 carbon atoms, and more particularly comprises hydrogen.

Examples of radical $R^2$ are hydrogen or the examples indicated for radical R.

Radical $R^2$ preferably comprises hydrogen atom or comprises alkyl radicals having 1 to 10 carbon atoms, optionally substituted by halogen atoms, and more preferably comprises alkyl radicals having 1 to 4 carbon atoms, more particularly the methyl or ethyl radical.

Polymers on which the polymer radical Y is based are understood in the sense of the present invention to be all polymers in which at least 50%, preferably at least 70%, more preferably at least 90% of all bonds in the main chain are carbon-carbon, carbon-nitrogen or carbon-oxygen bonds.

Examples of polymer radicals Y are polyester, polyether, polyurethane, polyalkylene and polyacrylate radicals.

Polymer radical Y preferably comprises organic polymer radicals which as their polymer chain, comprise polyoxyalkylenes such as polyoxyethylene, polyoxypropylene, polyoxybutylene, polyoxytetramethylene, polyoxyethylene-polyoxypropylene copolymers and polyoxypropylene-polyoxybutylene copolymers; hydrocarbon polymers such as polyisobutylene and copolymers of polyisobutylene with isoprene; polychloroprenes; polyisoprenes; polyurethanes; polyesters; polyamides; polyacrylates; polymethacrylates; vinyl polymers or polycarbonates, and which are bonded preferably via —O—C(=O)—NH—, —NH—C(=O)O—, —NH—C(=O)—NH—, —NR'—C(=O)—NH—, NH—C(=O)—NR'—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O— or —NR'— to the group or groups —[(CR$^1$$_2$)$_b$—SiR$_a$ (OR$^2$)$_{3-a}$], where R' may be identical or different and has a definition indicated for R or is a group —CH(COOR")—CH$_2$—COOR", in which R" may be identical or different and has a definition indicated for R.

Radical R' is preferably a group —CH(COOR")—CH$_2$—COOR" or an optionally substituted hydrocarbon radical having 1 to 20 carbon atoms, and more preferably is a linear, branched or cyclic alkyl group having 1 to 20 carbon atoms or is an aryl group having 6 to 20 carbon atoms and being optionally substituted by halogen atoms.

Examples of radicals R' are cyclohexyl, cyclopentyl, n-propyl, isopropyl and tert-butyl, the various stereoisomers of the pentyl radical, hexyl radical or heptyl radical, and also the phenyl radical.

The radicals R" are preferably alkyl groups having 1 to 10 carbon atoms, and more preferably are methyl, ethyl or propyl radicals.

Component (A) may in this case have the groups —[(CR$^1$$_2$)$_b$—SiR$_a$(OR$^2$)$_{3-a}$], attached in the manner described, at any desired locations in the polymer, such as within the chain and/or terminally.

Radical Y preferably comprises polyurethane radicals or polyoxyalkylene radicals, more preferably catenated polyurethane radicals or catenated polyoxyalkylene radicals having in each case 0 to 3 branching locations and terminally attached groups —[(CR$^1$$_2$)$_b$—SiR$_a$ (OR$^2$)$_{3-a}$], with branching locations in the sense of the invention meaning all branches off from the main chain that have more than one carbon atom, and with the radicals and indices having the definitions stated above.

More particularly, radical Y in formula (I) comprises catenated polyurethane radicals or catenated polyoxyalkylene radicals without branching locations and with terminally attached groups —[(CR$^1$$_2$)$_b$—SiR$_a$ (OR$^2$)$_{3-a}$], where the radicals and indices have the definitions stated above.

The polyurethane radicals Y are preferably radicals whose chain ends are bonded via —NH—C(=O)O—, —NH—C(=O)—NH—, —NR'—C(=O)—NH— or —NH—C(=O)—NR'—, more particularly via —O—C(=O)—NH— or —NH—C(=O)—NR'—, to the group or groups —[(CR$^1$$_2$)$_b$—SiR$_a$(OR$^2$)$_{3-a}$], with all of the radicals and indices having one of the above definitions. These polyurethane radicals Y are preparable preferably from linear or branched polyoxyalkylenes, especially from polypropylene glycols, and from di- or polyisocyanates. These polyurethane radicals Y preferably have average molar masses $M_n$ (number average) of 400 to 30,000 g/mol, preferably of 4000 to 20,000 g/mol. Suitable processes for preparing such a component (A), and also examples of component (A) itself, are described in, among other references, EP 1 093 482 B1 (paragraphs [0014]-[0023], [0039]-[0055] and also inventive example 1 and comparative example 1) or EP 1 641 854 B1 (paragraphs [0014]-[0035], inventive examples 4 and 6 and also comparative examples 1 and 2), which are taken to be part of the disclosure content of the present specification.

This number-average molar mass $M_n$ is determined for the purposes of the present invention by means of size exclusion chromatography (SEC) against a polystyrene standard, in THF, at 60° C., flow rate 1.2 ml/min and detection by RI (refractive index detector) on a Styragel HR3-HR4-HR5-HR5 column set from Waters Corp. USA with an injection volume of 100 μl.

The polyoxyalkylene radicals Y are preferably linear or branched polyoxyalkylene radicals, more preferably polyoxypropylene radicals, whose chain ends are bonded preferably via —O—C(=O)—NH— or —O— to the group or groups —[(CR$^1$$_2$)$_b$—SiR$_a$(OR$^2$)$_{3-a}$], where the radicals and indices have one of the definitions stated above. Preferably here at least 85%, more preferably at least 90%, more particularly at least 95% of all chain ends are bonded via —O—C(=O)—NH— to the group —[(CR$^1$$_2$)$_b$—SiR$_a$(OR$^2$)$_{3-a}$]. The polyoxyalkylene radicals Y preferably have average molar masses $M_n$ of 4000 to 30,000 g/mol, more preferably of 8000 to 20,000 g/mol. Suitable processes for preparing such a component (A), and also examples of component (A) itself, are described in, among other references, EP 1 535 940 B1 (paragraphs [0005]-[0025] and also inventive examples 1-3 and comparative examples 1-4) or EP 1 896 523 B1 (paragraphs [0008]-[0047]), which are taken to be part of the disclosure content of the present specification.

The end groups of the compounds (A) used in the invention are preferably groups of the general formulae —NH—C(=O)—NR'—(CR$^1$$_2$)$_b$—SiR$_a$(OR$^2$)$_{3-a}$ (Ia), —O—C(=O)—NH—(CR$^1$$_2$)$_b$—SiR$_a$(OR$^2$)$_{3-a}$ (Ib)

or

—O—(CR$^1$$_2$)$_b$—SiR$_a$(OR$^2$)$_{3-a}$ (Ic), where the radicals and indices have one of the definitions indicated for them above.

Where the compounds (A) are polyurethanes, as is preferred, they preferably have one or more of the end groups —NH—C(=O)—NR'—(CH$_2$)$_3$—Si(OCH$_3$)$_3$, —NH—C(=O)—NR'—(CH$_2$)$_3$—Si(OC$_2$H$_5$)$_3$, —O—C(=O)—NH—(CH$_2$)$_3$—Si(OCH$_3$)$_3$ or —O—C(=O)—NH—(CH$_2$)$_3$—Si(OC$_2$H$_5$)$_3$, where R' has the definition stated above.

Where the compounds (A) are polypropylene glycols, as is particularly preferred, they preferably have one or more of the end groups —O—(CH$_2$)$_3$—Si(CH$_3$)(OCH$_3$)$_2$, —O—(CH$_2$)$_3$—Si(OCH$_3$)$_3$, —O—C(=O)—NH—(CH$_2$)$_3$—Si(OC$_2$H$_5$)$_3$, —O—C(=O)—NH—CH$_2$—Si(CH$_3$)(OC$_2$H$_5$)$_2$, —O—C(=O)—NH—CH$_2$—Si(OCH$_3$)$_3$, —O—C(=O)—NH—CH$_2$—Si(CH$_3$)(OCH$_3$)$_2$ or —O—C(=O)—NH—(CH$_2$)$_3$—Si(OCH$_3$)$_3$, where the two last-mentioned end groups are particularly preferred.

The average molecular weights $M_n$ of the compounds (A) are preferably at least 400 g/mol, more preferably at least 4000 g/mol, more particularly at least 10,000 g/mol, and preferably at most 30,000 g/mol, more preferably at most 20,000 g/mol, more particularly at most 19,000 g/mol.

The viscosity of the compounds (A) is preferably 0.2 Pas, more preferably at least 1 Pas, most preferably at least 5 Pas, and preferably at most 700 Pas, more preferably at most 100 Pas, in each case measured at 20° C.

The viscosity of fluids which are not pastelike is determined for the purposes of the present invention after conditioning to 23° C. with a DV 3 P rotational viscometer from A. Paar (Brookfield systems) using spindle 6 at 5 Hz in accordance with ISO 2555.

The compounds (A) used in the invention are commercial products or can be prepared by methods which are common within chemistry.

The polymers (A) may be prepared by known processes, such as addition reactions, as for example hydrosilylation, Michael addition, Diels-Alder addition, or reactions between isocyanate-functional compounds with compounds having isocyanate-reactive groups.

Component (A) used in the invention may comprise only one kind of compound of the formula (I) or else mixtures of different kinds of compounds of the formula (I). This component (A) may exclusively comprise compounds of the formula (I) in which more than 90%, preferably more than 95% and more preferably more than 98% of all silyl groups bonded to the radical Y are identical. Then, however, it is also possible to use a component (A) which includes at least some compounds of the formula (I) in which different silyl groups are bonded to a radical Y. Lastly, mixtures of different compounds of the formula (I) can also be used as component (A), in which a total of at least 2 different kinds of silyl groups bonded to radicals Y are present, but where all silyl groups bonded to a respective radical Y are identical.

The coating compositions (BS) of the invention preferably comprise compounds (A) in concentrations of at most 60 wt %, more preferably at most 40 wt %, and preferably at least 8 wt %, more preferably at least 12 wt %.

Examples of radicals $R^3$ are the radicals indicated above for R, and also hydrogen atom, alkyl groups having 1 to 16 carbon atoms, and derivatives of 1,3,5-triazine, which are attached preferably via an alkylene group.

Radical $R^3$ is preferably a hydrogen atom or an unsubstituted hydrocarbon radical, more preferably a hydrogen atom or an alkyl group having 1 to 8 carbon atoms.

Examples of radicals $R^{13}$ are the radicals indicated above for $R^3$, and also a chemical bond to further structural elements of the stabilizer molecule.

Radical $R^{13}$ is preferably a hydrogen atom or an unsubstituted hydrocarbon radical, more preferably a hydrogen atom or an alkyl group having 1 to 8 carbon atoms.

Examples of radicals X are the radicals indicated above for $R^3$, or radicals $-OR^3$ or $-C(=O)R^3$, where $R^3$ has one of the exemplary definitions above, and also a chemical bond to further structural elements of the stabilizer molecule.

Radical X preferably is a chemical bond to further structural elements of the stabilizer molecule, or is a hydrogen atom or an unsubstituted hydrocarbon radical, and more preferably is a hydrogen atom or an alkyl group having 1 to 8 carbon atoms.

Examples of radicals Z are radicals $-OR^{13}$ or radicals $-NR^{13}_2$, where $R^{13}$ has one of the exemplary definitions above.

Radical Z preferably comprises radicals $-OR^{13}$ or radicals $-NR^{13}_2$ in which $R^{13}$ independently at each occurrence represents a chemical bond to further structural elements of the stabilizer molecule, a hydrogen atom, or an unsubstituted hydrocarbon radical.

More preferably radical Z comprises radicals $-OR^{13}$ or radicals $-NR^{13}_2$, especially $-NR^{13}_2$, in which $R^{13}$ independently at each occurrence represents a chemical bond to further structural elements of the stabilizer molecule.

Examples of radicals $R^4$ are the radicals indicated above for R, and also hydrogen atom.

Radical $R^4$ is preferably hydrogen atom.

The functional groups of the formula (II) are preferably groups selected from the formulae (IIa), (IIb), (IIc), (IId), (IIe) and (IIf),

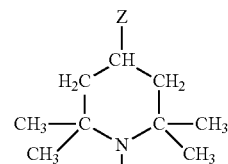

(IIa)

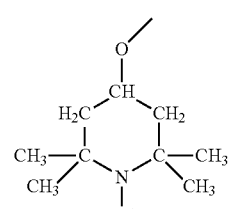

(IIb)

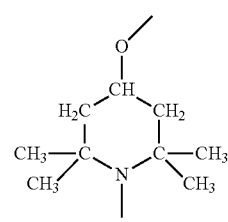

(IIc)

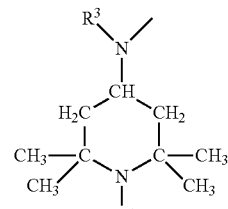

(IId)

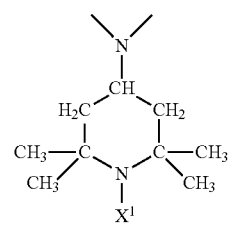

(IIe)

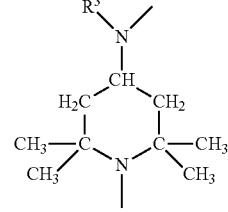

(IIf)

where Z and $R^3$ have the definition indicated for them and $X^1$ may be identical or different and represents a hydrogen atom, a radical $R^3$, a radical $OR^3$ or a radical $C(=O)R^3$.

The HALS stabilizers (B) used in the invention are preferably stabilizers (B1), (B2) or (B3) in which all functional groups of the formula (II) correspond to one of the formulae (IIa), (IIb), (IIc), (IId), (IIe) or (IIf).

In one embodiment the stabilizer (B) used in the invention comprises stabilizer (B3) which has at least two functional groups selected from the formulae (IIa) to (IIf) and at least one functional group having a 2,6-di-t-butylphenol structure. One example of such a stabilizer (B3) is Tinuvin® 144 from BASF SE (Ludwigshafen, DE).

The stabilizer (B) of the invention preferably comprises mixtures (B1) or organic compounds (B2).

The organic compounds (B2) are preferably those containing at least 4, more particularly at least 6, functional groups of the formula (II), preferably selected from the formulae (IIa) to (IIf).

The mixtures of different organic compounds (B1) are preferably those having per molecule on average at least 3, more particularly at least 4, functional groups of the formula (II), preferably selected from the formulae (IIa) to (IIf).

The stabilizer mixtures (B1) preferably have average molar masses ($M_n$) of at least 1000 g/mol, more preferably of at least 2000 g/mol, more particularly of at least 2500 g/mol.

The stabilizers (B2) preferably have molar masses or average molar masses ($M_n$) of at least 1000 g/mol, more preferably of at least 2000 g/mol, more particularly of at least 2500 g/mol.

The stabilizers (B1) used in the invention preferably comprise, exclusively or partly, functional groups of the formulae (IIc) or (IIe). More preferably the stabilizers (B1) used in the invention comprise exclusively functional groups of the formulae (IIc) or (IIe).

The stabilizers (B2) used in the invention preferably comprise, exclusively or partly, functional groups of the formulae (IIc) or (IIe). More preferably the stabilizers (B2) used in the invention comprise exclusively functional groups of the formulae (IIc) or (IIe).

In addition to the functional groups of the formula (II), preferably selected from the formulae (IIa) to (IIf), and also, optionally, the optionally substituted hydroxyphenyl groups, the stabilizers (B1), (B2) and (B3) used in the invention have further structural elements. These may be any desired organic structures, consisting preferably of building blocks selected from carbon atoms, hydrogen atoms, oxygen atoms and nitrogen atoms. Particularly preferred structural elements in this context are alkyl chains, aryl groups, ester groups, substituted and unsubstituted amine functions, ether groups, nitrogen-containing aromatics such as 1,3,5-triazines, more particularly alkyl chains, ester groups, substituted and unsubstituted amine functions, 1,3,5-triazines. These structural elements and the functional groups, i.e., groups of the formula (II) and also optionally substituted hydroxyphenyl groups, may be joined to one another in any desired arrangement through chemical bonds.

Examples of stabilizers (B2) and (B1) particularly preferred in the invention are commercially available products such as Tinuvin® 622, Chimassorb® 944, Chimassorb® 119 FDL or Chimassorb® 2020 from BASF SE (Ludwigshafen, DE).

In one especially preferred configuration the stabilizers (B2) or (B1) used in the invention comprise not only the functional groups of the formula (II), preferably selected from the formulae (IIa) to (IIf), more preferably formulae (IIc) or (IIe), but also at least one structural unit which has UV-absorbing properties, more particularly a structural unit having a benzophenone structure, an oxalanilide structure, a benzotriazole structure or a triazine structure, particular preference being given to the triazine structure as structural unit having UV-absorbing properties.

Examples of these especially preferred stabilizers (B1) and (B2) are the products Chimassorb® 944, Chimassorb® 119 FDL or Chimassorb® 2020 from BASF SE (Ludwigshafen, DE).

The coating compositions (BS) of the invention comprise preferably at least 0.1 part by weight, more preferably at least 0.5 part by weight, yet more preferably at least 1.0 part by weight, and most preferably at least 2.0 parts by weight of component (B), based in each case on 100 parts by weight of component (A). Based in each case on 100 parts by weight of component (A), the coating compositions (BS) of the invention preferably comprise at most 30 parts by weight, more preferably at most 25 parts by weight, yet more preferably at most 20 parts by weight, and most preferably at most 15 parts by weight of component (B).

The total fraction of components (A) and (B) in the material (BS) of the invention is at least 8 wt %, preferably at least 13 wt %.

In one preferred configuration of the invention, the coating compositions (BS) of the invention comprise not only components (A) and (B) but also at least one further component.

Additionally to the components (A) and (B), the materials (BS) of the invention preferably comprise at least one further component selected from reactive diluents (C), silicone resins (D), and nonreactive plasticizers (E), more preferably at least one further component selected from component (C) or (D). More particularly the materials (BS) of the invention comprise reactive diluents (C) additionally to components (A) and (B).

The component (C) used optionally in the invention comprises reactive diluents of the formula

$$R^7\text{—SiR}^5{}_c(OR^6)_{3-c} \quad (III),$$

in which $R^3$ may be identical or different and represents a monovalent, optionally substituted hydrocarbon radical, $R^6$ may be identical or different and represents hydrogen atom or a monovalent, optionally substituted hydrocarbon radical, $R^7$ is an aryl group or a linear, branched or cyclic alkyl group or alkenyl group having 6 to 40 carbon atoms, in which individual hydrogen atoms are optionally substituted by organic radicals, and, if $R^7$ is a linear, branched or cyclic alkyl group or alkenyl group, the carbon chain may optionally be interrupted by oxygen atoms, and c is 0, 1 or 2, preferably 0 or 1, more preferably 0.

Radical $R^5$ has the same preferred and more preferred definitions as described for the radical R.

Radical $R^6$ has the same preferred and more preferred definitions as described for the radical $R^2$.

Radical $R^7$ is preferably an optionally substituted linear or branched alkyl group having 8 to 40 carbon atoms, in which the carbon chain may optionally be interrupted by oxygen atoms. More preferably radical $R^7$ is a linear or branched alkyl radical having 8 to 20 carbon atoms.

Especially preferred examples of radicals $R^7$ are the isooctyl, n-octyl, n-decyl, n-dodecyl, n-tetradecyl and n-hexadecyl radicals, especially n-hexadecyl radicals.

Examples of reactive diluents (C) used optionally in the invention are isooctyltrimethoxysilane, isooctyltriethoxysilane, n-octyltrimethoxysilane, n-octyltriethoxysilane, n-decyltrimethoxysilane, n-decyltriethoxysilane, n-dodecyltrimethoxysilane, n-dodecyltriethoxysilane, n-tetradecyltrimethoxysilane, n-tetradecyltriethoxysilane, n-hexadecyltrimethoxysilane, n-hexadecyltriethoxysilane and n-octadecyltriethoxysilane.

The reactive diluents (C) optionally used in the invention are commercial products or may be prepared by methods which are common within silicon chemistry.

Where the coating compositions (BS) of the invention comprise component (C), the amounts are preferably 10 to 300 parts by weight, more preferably 25 to 200 parts by weight, and most preferably 50 to 150 parts by weight, based in each case on 100 parts by weight of component (A).

The component (D) optionally used in the invention comprises one or more silicone resins comprising units of the formula

$$R^8_d(R^9O)_e R^{10}_f SiO_{(4-d-e-f)/2} \qquad (IV),$$

where
R$^8$ may be identical or different and denotes hydrogen, a monovalent, SiC-bonded, optionally substituted aliphatic hydrocarbon radical or a divalent, optionally substituted, aliphatic hydrocarbon radical which bridges two units of the formula (IV),
R$^9$ may be identical or different and denotes hydrogen atom or a monovalent, optionally substituted hydrocarbon radical,
R$^{10}$ may be identical or different and denotes a monovalent, SiC-bonded, optionally substituted, aromatic hydrocarbon radical,
d is 0, 1, 2 or 3,
e is 0, 1, 2 or 3, preferably 0, 1 or 2, more preferably 0 or 1, and
f is 0, 1 or 2, preferably 0 or 1,
with the proviso that the sum of d+e+f is less than or equal to 3 and in at least 40% of the units of the formula (IV) the sum d+f is 0 or 1.

Component (D) consists preferably to an extent of at least 90 wt % of units of the formula (IV). More preferably component (D) consists exclusively of units of the formula (IV).

Examples of radicals R$^8$ are the aliphatic radicals indicated above for R. Radical R$^8$ may alternatively comprise divalent aliphatic radicals which join two silyl groups of the formula (IV) to one another, such as, for example, alkylene radicals having 1 to 10 carbon atoms, such as, for instance, methylene, ethylene, propylene or butylene radicals. One particularly common example of a divalent aliphatic radical is the ethylene radical.

Preferably, however, radical R$^8$ comprises monovalent, SiC-bonded aliphatic hydrocarbon radicals having 1 to 18 carbon atoms that are optionally substituted by halogen atoms, and more preferably comprises aliphatic hydrocarbon radicals having 1 to 8 carbon atoms, such as, for instance, methyl, ethyl, propyl, butyl, n-octyl or isooctyl radicals, more particularly the isooctyl or methyl radical, the methyl radical being especially preferred.

Examples of radical R$^9$ are hydrogen atom or the examples indicated for radical R.

Radical R$^9$ preferably comprises hydrogen atom or alkyl radicals having 1 to 10 carbon atoms and being optionally substituted by halogen atoms, and more preferably comprises alkyl radicals having 1 to 4 carbon atoms, and more particularly comprises the methyl or ethyl radical.

Examples of radicals R$^{10}$ are the aromatic radicals indicated above for R.

Radical R$^{10}$ preferably comprises SiC-bonded aromatic hydrocarbon radicals having 1 to 18 carbon atoms and being optionally substituted by halogen atoms, such as, for example, ethylphenyl, tolyl, xylyl, chlorophenyl, naphthyl or styryl radicals, and more preferably comprises the phenyl radical.

Preferred for use as component (D) are silicone resins in which at least 90% of all radicals R$^8$ are n-octyl, isooctyl or methyl radicals, and more preferably at least 90% of all radicals R$^8$ are methyl radical.

Preferred for use as component (D) are silicone resins in which at least 90% of all radicals R$^9$ are methyl, ethyl, propyl or isopropyl radicals.

Preferred for use as component (D) are silicone resins in which at least 90% of all radicals R$^{10}$ are phenyl radicals.

The silicone resins (D) used optionally in the invention are preferably resins having at least 20%, more preferably at least 40%, of units of the formula (IV) in which d is 0, based in each case on the total number of units of the formula (IV).

The silicone resins (D) optionally used in the invention are preferably resins which, based in each case on the total number of units of the formula (IV), have at least 50%, more preferably at least 70%, of units of the formula (IV) in which e has a value of 0 or 1.

The silicone resins (D) used optionally in the invention are preferably resins which, based in each case on the total number of units of the formula (IV), have at least 20%, more preferably at least 40%, most preferably at least 50% of units of the formula (IV) in which f has a value of 1.

The silicone resins (D) optionally used in the invention are more preferably resins which have exclusively units of the formula (IV) in which f is 1.

The silicone resins (D) optionally used in the invention are more preferably resins which, based in each case on the total number of units of the formula (IV), have at least 20%, more preferably at least 40%, most preferably at least 50% of units of the formula (IV) in which f has the value of 1 and d has the value of 0.

The silicone resins (D) optionally used in the invention are preferably resins which, based in each case on the total number of units of the formula (IV), have at least 50%, preferably at least 60%, more preferably at least 70% of units of the formula (IV) in which the sum d+f is 0 or 1.

Examples of the silicone resins (D) used optionally in the invention are organopolysiloxane resins which consist substantially, preferably exclusively, of units selected from (Q) units of the formulae SiO$_{4/2}$, Si(OR$^9$)O$_{3/2}$, Si(OR$^9$)$_2$O$_{2/2}$ and Si(OR$^9$)$_3$O$_{1/2}$, (T) units of the formulae PhSiO$_{3/2}$, PhSi(OR$^9$)O$_{2/2}$, PhSi(OR$^9$)$_2$O$_{1/2}$, MeSiO$_{3/2}$, MeSi(OR$^9$)O$_{2/2}$, MeSi(OR$^9$)$_2$O$_{1/2}$, i-OctSiO$_{3/2}$, i-OctSi(OR$^9$)O$_{2/2}$, i-OctSi(OR$^9$)$_2$O$_{1/2}$, n-OctSiO$_{3/2}$, n-OctSi(OR$^9$)O$_{2/2}$ and n-OctSi(OR$^9$)$_2$O$_{1/2}$, (D) units of the formulae Me$_2$SiO$_{2/2}$ and Me$_2$Si(OR$^9$)O$_{1/2}$, and (M) units of the formula Me$_3$SiO$_{1/2}$, where Me stands for methyl radical, Ph for phenyl radical, n-Oct for n-octyl radical and i-Oct for isooctyl radical and where R$^9$ has the definition stated above, with the resin per mole of (T) units having preferably 0-2 mol of (Q) units, 0-2 mol of (D) units and 0-2 mol of (M) units.

Preferred examples of the silicone resins (D) optionally used in the invention are organopolysiloxane resins which consist substantially, preferably exclusively, of units selected from T units of the formulae PhSiO$_{3/2}$, PhSi(OR$^9$)O$_{2/2}$ and PhSi(OR$^9$)$_2$O$_{1/2}$ and also T units of the formulae MeSiO$_{3/2}$, MeSi(OR$^9$)O$_{2/2}$ and MeSi(OR$^9$)$_2$O$_{1/2}$, where Me stands for methyl radical, Ph for phenyl radical and R$^9$ for hydrogen atom, methyl or ethyl radical.

Further preferred examples of the silicone resins (D) used optionally in the invention are organopolysiloxane resins which consist substantially, preferably exclusively, of units selected from T units of the formulae PhSiO$_{3/2}$, PhSi(OR$^9$)O$_{2/2}$ and PhSi(OR$^9$)$_2$O$_{1/2}$, T units of the formulae MeSiO$_{3/2}$, MeSi(OR$^9$)O$_{2/2}$ and MeSi(OR$^9$)$_2$O$_{1/2}$, and also D units of the formulae Me$_2$SiO$_{2/2}$ and Me$_2$Si(OR$^9$)O$_{1/2}$, where Me stands for methyl radical, Ph for phenyl radical and R$^9$ for hydrogen atom, methyl or ethyl radical, with a molar ratio of phenylsilicone to methylsilicone units of 0.5 to 4.0. The content of D units in these silicone resins is preferably below 10 wt %.

Particularly preferred examples of the silicone resins (D) optionally used in the invention are organopolysiloxane resins which consist to an extent of 80%, preferably 90%, more particularly exclusively, of T units of the formulae PhSiO$_{3/2}$, PhSi(OR$^9$)O$_{2/2}$ and PhSi(OR$^9$)$_2$O$_{1/2}$, where Ph stands for phenyl radical and R$^9$ stands for hydrogen atom, methyl radical or ethyl radical, based in each case on the total number of units.

The silicone resins (D) used optionally in the invention preferably possess an average molar mass (number average)

$M_n$ of at least 400 g/mol and more preferably of at least 600 g/mol. The average molar mass $M_n$ is preferably at most 400,000 g/mol, more preferably at most 10,000 g/mol, more particularly at most 3000 g/mol.

The silicone resins (D) used optionally in the invention may be either solid or liquid at 23° C. and 1000 hPa, with silicone resins (D) being preferably liquid. The silicone resins (D) preferably possess a viscosity at 23° C. of 10 to 100,000 mPas, preferably of 50 to 50,000 mPas, most preferably of 100 to 20,000 mPas.

The silicone resins (D) used optionally in the invention preferably possess a polydispersity ($M_w/M_n$) of not more than 5, more preferably of not more than 3.

The mass-average molar mass $M_w$, like the number-average molar masses $M_n$, is determined by size exclusion chromatography (SEC) against a polystyrene standard, in THF, at 60° C., flow rate 1.2 ml/min and detection with RI (refractive index detector) on a Styragel HR3-HR4-HR5-HR5 column set from Waters Corp. USA with an injection volume of 100 μl.

The silicone resins (D) can be used either in pure form or in the form of a mixture with a suitable solvent (DL).

Solvents (DL) used may be all compounds which at room temperature are inert toward components (A) to (D) and have a boiling point <250° C. at 1013 mbar.

Examples of optionally employed solvents (DL) are ethers, such as diethyl ether, methyl tert-butyl ether, ether derivatives of glycol, and THF; esters, such as ethyl acetate, butyl acetate and glycol esters; aliphatic hydrocarbons, such as pentane, cyclopentane, hexane, cyclohexane, heptane, octane, or else longer-chain branched and unbranched alkanes; ketones, such as acetone and methyl ethyl ketone; aromatics, such as toluene, xylene, ethylbenzene and chlorobenzene; or else alcohols, such as methanol, ethanol, glycol, propanol, isopropanol, glycerol, butanol, isobutanol and tert-butanol, for example.

If component (D) is used, then in one particularly preferred configuration of the invention, use is made of silicone resins which, with the exception of alcohols $R^9OH$, contain less than 0.1 wt %, preferably less than 0.05 wt %, more preferably less than 0.02 wt %, more particularly less than 0.01 wt %, of solvents (DL), where $R^9$ has the definition stated above.

If component (D) is used, then in one particularly preferred configuration of the invention, use is made of silicone resins which, with the exception of alcohols $R^9OH$, contain no solvents (DL) at all, where $R^9$ has the definition stated above and where alcohols $R^9OH$ are present in amounts of preferably not more than 5 wt %, more preferably 0 to 1 wt %, in general deriving from the preparation process.

The silicone resins (D) optionally used in the invention are commercial products or may be prepared by methods which are common within silicon chemistry. Commercially available examples are the resins SILRES® SY 231, SILRES® IC 231, SILRES® IC 368, SILRES® IC 678 or SILRES® BS 1268, GENIOSIL® LX 678 or GENIOSIL® LX 368 from Wacker Chemie AG, Munich, DE.

Where the coating compositions (BS) of the invention do comprise component (D), the amounts involved are preferably 25 to 500 parts by weight, more preferably 50 to 300 parts by weight, more particularly 80 to 200 parts by weight, based in each case on 100 parts by weight of component (A).

Component (E) used optionally in the invention comprises one or more nonreactive plasticizers. Nonreactive plasticizers (E) in the context of the present invention are taken to be all organic compounds which at temperatures <80° C. and a pressure of 1013 hPa react neither with water nor with components (A), (B), (C) or (D), and which are liquid at 20° C. and 1013 hPa and have a boiling point >250° C. at 1013 hPa. Preferred nonreactive plasticizers (E) are those selected from the chemical groups of the fully esterified aromatic or aliphatic carboxylic acids,
fully esterified derivatives of phosphoric acid,
fully esterified derivatives of sulfonic acids,
branched or unbranched saturated hydrocarbons,
polystyrenes,
polybutadienes,
polyisobutylenes,
polyesters, and
polyethers.

Examples of carboxylic ester plasticizers (E) are phthalic esters such as dioctyl phthalate, diisooctyl phthalate and diundecyl phthalate; perhydrogenated phthalic esters such as diisononyl 1,2-cyclohexanedicarboxylate and dioctyl 1,2-cyclohexanedicarboxylate; adipic esters such as dioctyl adipate; benzoic esters; esters of trimellitic acid, glycol esters; esters of saturated alkanediols such as 2,2,4-trimethyl-1,3-pentanediol monoisobutyrates and 2,2,4-trimethyl-1,3-pentanediol diisobutyrates, for example.

Examples of polyether plasticizers (E) are, for example, polyethylene glycols, polyTHF, and polypropylene glycols preferably having molar masses of 200 to 22,000 g/mol.

Preferred plasticizers (E) are those having molar masses or, in the case of polymeric plasticizers, average molar masses $M_n$ of greater than 200 g/mol, more preferably of greater than 500 g/mol, most preferably of greater than 900 g/mol. Preferably they possess molar masses or average molar masses $M_n$ of not more than 20,000 g/mol, more preferably of not more than 10,000 g/mol, more particularly not more than 4,000 g/mol.

If component (E) is used, it preferably comprises phthalic acid-free plasticizers, such as perhydrogenated phthalic esters, esters of trimellitic acid, polyesters or polyethers.

Where the coating compositions (BS) of the invention do contain component (E), the amounts are preferably 10 to 300 parts by weight, more preferably 40 to 250 parts by weight, most preferably 70 to 200 parts by weight, based in each case on 100 parts by weight of component (A).

In addition to the components (A) and (B) and also optionally (C) to (E) that are used, the coating compositions (BS) of the invention may comprise all further substances which have also been employed to date in silane-crosslinkable materials and which are different from components (A) to (E), such as, for example, nitrogen-containing organosilicon compounds (F), fillers (G), catalysts (H), adhesion promoters (I), water scavengers (J), additives (K), and adjuvants (L).

Component (F) preferably comprises organosilicon compounds comprising units of the formula

$$D_h Si(OR^{11})_g R^{12}{}_i O_{(4-g-h-i)/2} \qquad (V),$$

in which
D may be identical or different and denotes a monovalent, SiC-bonded radical with basic nitrogen,
$R^{11}$ may be identical or different and denotes hydrogen atom or optionally substituted hydrocarbon radicals,
$R^{12}$ may be identical or different and denotes a monovalent, optionally substituted, SiC-bonded, nitrogen-free organic radical,
i is 0, 1, 2 or 3, preferably 1 or 0,
g is 0, 1, 2 or 3, preferably 1, 2 or 3, more preferably 2 or 3, and
h is 0, 1, 2, 3 or 4, preferably 1,
with the proviso that the sum of g+h+i is less than or equal to 4 and there is at least one radical D present per molecule.

In one preferred configuration of the invention, the coating compositions (BS) of the invention comprise not only components (A), (B) and also, optionally, (C) to (E) but also at least one further component (F).

The organosilicon compounds (F) optionally used in the invention may be not only silanes, i.e., compounds of the formula (V) with g+h+i=4, but also siloxanes, i.e., compounds comprising units of the formula (V) with g+h+i≤3, and preferably are silanes.

Examples of optionally substituted hydrocarbon radicals $R^{11}$ are the examples indicated for radical R.

The radicals $R^{11}$ are preferably hydrogen atom and hydrocarbon radicals having 1 to 18 carbon atoms and being optionally substituted by halogen atoms, and more preferably are hydrogen atom and hydrocarbon radicals having 1 to 10 carbon atoms, and more particularly are methyl and ethyl radical.

Examples of radical $R^{12}$ are the examples indicated for R.

Radical $R^{12}$ preferably comprises hydrocarbon radicals having 1 to 18 carbon atoms and being optionally substituted by halogen atoms, and more preferably comprises hydrocarbon radicals having 1 to 5 carbon atoms, and most preferably comprises the methyl radical.

Examples of radicals D are radicals of the formulae $H_2N(CH_2)_3$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $C_3H_7NH(CH_2)_3$—, $C_4H_9NH(CH_2)_3$—, $C_5H_{11}NH(CH_2)_3$—, $C_6H_{13}NH(CH_2)_3$—, $C_7H_{15}NH(CH_2)_3$—, $H_2N(CH_2)_4$—, $H_2N$—$CH_2$—$CH(CH_3)$—$CH_2$—, $H_2N(CH_2)_5$—, cyclo-$C_5H_9NH(CH_2)_3$—, cyclo-$C_6H_{11}NH(CH_2)_3$—, phenyl-$NH(CH_2)_3$—, $(CH_3)_2N(CH_2)_3$—, $(C_2H_5)_2N(CH_2)_3$—, $(C_3H_7)_2NH(CH_2)_3$—, $(C_4H_9)_2NH(CH_2)_3$—, $(C_5H_{11})_2NH(CH_2)_3$—, $(C_6H_{13})_2NH(CH_2)_3$—, $(C_7H_{15})_2NH(CH_2)_3$—, $H_2N(CH_2)$—, $H_2N(CH_2)_2NH(CH_2)$—, $H_2N(CH_2)_2NH(CH_2)_2NH(CH_2)$—, $H_3CNH(CH_2)$—, $C_2H_5NH(CH_2)$—, $C_3H_7NH(CH_2)$—, $C_4H_9NH(CH_2)$—, $C_5H_{11}NH(CH_2)$—, $C_6H_{13}NH(CH_2)$—, $C_7H_{15}NH(CH_2)$—, cyclo-$C_5H_9NH(CH_2)$—, cyclo-$C_6H_{11}NH(CH_2)$—, phenyl-$NH(CH_2)$—, $(CH_3)_2N(CH_2)$—, $(C_2H_5)_2N(CH_2)$—, $(C_3H_7)_2NH(CH_2)$—, $(C_4H_9)_2NH(CH_2)$—, $(C_5H_{11})_2NH(CH_2)$—, $(C_6H_{13})_2NH(CH_2)$—, $(C_7H_{15})_2NH(CH_2)$—, $(CH_3O)_3Si(CH_2)_3NH(CH_2)_3$—, $(C_2H_5O)_3Si(CH_2)_3NH(CH_2)_3$—, $(CH_3O)_2(CH_3)Si(CH_2)_3NH(CH_2)_3$— and $(C_2H_5O)_2(CH_3)Si(CH_2)_3NH(CH_2)_3$—, and also reaction products of the above-stated primary amino groups with compounds which contain epoxide groups or double bonds that are reactive toward primary amino groups.

Radical D preferably comprises the $H_2N(CH_2)_3$—, $H_2N(CH_2)_2NH(CH_2)_3$— or cyclo-$C_6H_{11}NH(CH_2)_3$— radical.

Examples of the silanes of formula (V) optionally used optionally in the invention are $H_2N(CH_2)_3$—$Si(OCH_3)_3$, $H_2N(CH_2)_3$—$Si(OC_2H_5)_3$, $H_2N(CH_2)_3$—$Si(OCH_3)_2CH_3$, $H_2N(CH_2)_3$—$Si(OC_2H_5)_2CH_3$, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3$, $H_2N(CH_2)_2NH(CH_2)_3$—$Si(OH)_3$, $H_2N(CH_2)_2NH(CH_2)_3$—$Si(OH)_2CH_3$, $H_2N(CH_2)_2NH(CH_2)_2NH(CH_2)_3$—$Si(OCH_3)_3$, $H_2N(CH_2)_2NH(CH_2)_2NH(CH_2)_3$—$Si(OC_2H_5)_3$, cyclo-$C_6H_{11}NH(CH_2)_3$—$Si(OCH_3)_3$, cyclo-$C_6H_{11}NH(CH_2)_3$—$Si(OC_2H_5)_3$, cyclo-$C_6H_{11}NH(CH_2)_3$—$Si(OCH_3)_2CH_3$, cyclo-$C_6H_{11}NH(CH_2)_3$—$Si(OC_2H_5)_2CH_3$, cyclo-$C_6H_{11}NH(CH_2)_3$—$Si(OH)_3$, cyclo-$C_6H_{11}NH(CH_2)_3$—$Si(OH)_2CH_3$, phenyl-$NH(CH_2)_3$—$Si(OCH_3)_3$, phenyl-$NH(CH_2)_3$—$Si(OC_2H_5)_3$, phenyl-$NH(CH_2)_3$—$Si(OCH_3)_2CH_3$, phenyl-$NH(CH_2)_3$—$Si(OC_2H_5)_2CH_3$, phenyl-$NH(CH_2)_3$—$Si(OH)_3$, phenyl-$NH(CH_2)_3$—$Si(OH)_2CH_3$, $HN((CH_2)_3$—$Si(OCH_3)_3)_2$, $HN((CH_2)_3$—$Si(OC_2H_5)_3)_2$$HN((CH_2)_3$—$Si(OCH_3)_2CH_3)_2$, $HN((CH_2)_3$—$Si(OC_2H_5)_2CH_3)_2$, cyclo-$C_6H_{11}NH(CH_2)$—$Si(OCH_3)_3$, cyclo-$C_6H_{11}NH(CH_2)$—$Si(OC_2H_5)_3$, cyclo-$C_6H_{11}NH(CH_2)$—$Si(OCH_3)_2CH_3$, cyclo-$C_6H_{11}NH(CH_2)$—$Si(OC_2H_5)_2CH_3$, cyclo-$C_6H_{11}NH(CH_2)$—$Si(OH)_3$, cyclo-$C_6H_{11}NH(CH_2)$—$Si(OH)_2CH_3$, phenyl-$NH(CH_2)$—$Si(OCH_3)_3$, phenyl-$NH(CH_2)$—$Si(OC_2H_5)_3$, phenyl-$NH(CH_2)$—$Si(OCH_3)_2CH_3$, phenyl-$NH(CH_2)$—$Si(OC_2H_5)_2CH_3$, phenyl-$NH(CH_2)$—$Si(OH)_3$ and phenyl-$NH(CH_2)$—$Si(OH)_2CH_3$ and also their partial hydrolysates, preference being given to $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, cyclo-$C_6H_{11}NH(CH_2)_3$—$Si(OCH_3)_3$, cyclo-$C_6H_{11}NH(CH_2)_3$—$Si(OC_2H_5)_3$ and cyclo-$C_6H_{11}NH(CH_2)_3$—$Si(OCH_3)_2CH_3$ and also in each case their partial hydrolysates, and particular preference being given to $H_2N(CH_2)_2NH(CH_2)_3$—$Si(OCH_3)_3$, $H_2N(CH_2)_2NH(CH_2)_3$—$Si(OCH_3)_2CH_3$, cyclo-$C_6H_{11}NH(CH_2)_3$—$Si(OCH_3)_3$, cyclo-$C_6H_{11}NH(CH_2)_3$—$Si(OCH_3)_2CH_3$ and also in each case their partial hydrolysates.

In the coating compositions (BS) of the invention, the organosilicon compounds (F) optionally used in the invention may also take on the function of a curing catalyst or curing cocatalyst.

Furthermore, the organosilicon compounds (F) optionally used in the invention may act as adhesion promoters and/or as water scavengers.

The organosilicon compounds (F) optionally used in the invention are commercial products and/or are preparable by methods which are common within chemistry.

If the coating compositions (BS) of the invention do contain component (F), the amounts involved are preferably 0.1 to 25 parts by weight, more preferably 0.5 to 15 parts by weight, based in each case on 100 parts by weight of component (A).

The materials of the invention preferably do comprise component (F).

The fillers (G) optionally used in the coating compositions (BS) of the invention may be any desired fillers known to date.

Examples of fillers (G) are nonreinforcing fillers, these being fillers having a BET surface area of preferably up to 50 $m^2/g$, such as quartz, diatomaceous earth, calcium silicate, zirconium silicate, talc, kaolin, zeolites, metal oxide powders, such as aluminum oxide, titanium oxide, iron oxide or zinc oxide and their mixed oxides, barium sulfate, calcium carbonate, mixed-crystal forms of kaolin and quartz such as Sillitin V85, Silfit Z 91 or Aktifit VM from Hoffmann Mineral (Neuburg, DE), gypsum, silicon nitride, silicon carbide, boron nitride, glass powders and plastics powders, such as polyacrylonitrile powders; reinforcing fillers, these being fillers having a BET surface area of more than 50 $m^2/g$, such as pyrogenically manufactured silica, precipitated silica, precipitated chalk, carbon black, such as furnace black and acetylene black, and mixed silicon-aluminum oxides of high BET surface area; aluminum trihydroxide, fillers in hollow sphere form, such as ceramic microspheres, examples being those available under the trade name Zeeospheres™ from 3M Deutschland GmbH at Neuss, DE, elastic polymeric spheres, such as, for instance, those available under the trade name EXPANCEL® from AKZO NOBEL, Expancel at Sundsvall, Sweden, or glass spheres; fibrous fillers, such as asbestos and also polymeric fibers. The stated fillers may have been hydrophobized, by means, for example, of treatment with organosilanes and/or organosiloxanes or with stearic acid, or by etherification of hydroxyl groups to alkoxy groups.

The fillers (G) optionally used are preferably calcium carbonate, talc, aluminum trihydroxide or silica, particular preference being given to the use of aluminum hydroxide on account of the fire prevention effect additionally possessed by this filler. Preferred calcium carbonate grades are ground or precipitated and optionally surface-treated with fatty acids such as stearic acid or salts thereof. The preferred silica preferably comprises fumed silica.

Fillers (G) optionally employed preferably have a moisture content of below 1 wt %, more preferably of below 0.5 wt %.

If the coating compositions (BS) of the invention do include fillers (G), the amounts involved are preferably 10 to 1000 parts by weight, more preferably 50 to 500 parts by weight, most preferably 70 to 300 parts by weight, based in each case on 100 parts by weight of constituent (A). The materials of the invention preferably do comprise fillers (G).

In one particular configuration of the invention, the coating compositions (BS) of the invention comprise as fillers (G) a combination of a) silica, especially fumed silica, and b) calcium carbonate, aluminum trihydroxide and/or talc.

If the coating compositions (BS) of the invention do contain this particular combination of different fillers (G), they preferably contain 1 to 80 parts by weight, more preferably 5 to 40 parts by weight, of silica, especially fumed silica, and preferably 10 to 500 parts by weight, more preferably 50 to 300 parts by weight, of calcium carbonate, aluminum trihydroxide, talc, or mixtures of these materials, based in each case on 100 parts by weight of constituent (A).

In one particularly preferred configuration, the compositions (BS) of the invention preferably comprise, as well as one of the abovementioned preferred filler combinations, titanium dioxide as well in amounts of 0.1 to 100 parts by weight, more preferably amounts from 2 to 50 parts by weight and especially from 1 to 20 parts by weight, based in each case on 100 parts by weight of constituent (A).

The catalysts (H) optionally used in the coating compositions (BS) of the invention may be any desired catalysts known to date for materials which cure by silane condensation.

Examples of metal-containing curing catalysts (H) are organotitanium and organotin compounds, examples being titanic esters, such as tetrabutyl titanate, tetrapropyl titanate, tetraisopropyl titanate and titanium tetraacetylacetonate; tin compounds, such as dibutyltin dilaurate, dibutyltin maleate, dibutyltin diacetate, dibutyltin dioctanoate, dibutyltin acetylacetonate, dibutyltin oxides, and corresponding dioctyltin compounds.

Examples of metal-free curing catalysts (H) are basic compounds, such as triethylamine, tributylamine, 1,4-diazabicyclo[2.2.2]octane, 1,5-diazabicyclo[4.3.0]non-5-ene, 1,8-diazabicyclo[5.4.0]undec-7-ene, N,N-bis(N,N-dimethyl-2-aminoethyl)methylamine, N,N-dimethylcyclohexylamine, N,N-dimethylphenylamine and N-ethylmorpholine.

It is likewise possible as catalyst (H) to use acidic compounds, such as phosphoric acid and its esters, toluenesulfonic acid, sulfuric acid, nitric acid, or else organic carboxylic acids, e.g., acetic acid and benzoic acid.

If the coating compositions (BS) of the invention do include catalysts (H), the amounts involved are preferably 0.01 to 20 parts by weight, more preferably 0.05 to 5 parts by weight, based in each case on 100 parts by weight of constituent (A).

In one configuration of the invention, the catalysts (H) optionally used are metal-containing curing catalysts, preferably tin-containing catalysts. This embodiment of the invention is preferred especially when component (A) consists wholly or at least partly, i.e., to an extent of at least 90 wt %, preferably at least 95 wt %, of compounds of the formula (I) in which b is other than 1.

In the case of the coating compositions (BS) of the invention it is possible with preference to do without metal-containing catalysts (H), and especially without tin-containing catalysts, when component (A) consists wholly or at least partly, i.e., to an extent of at least 10 wt %, preferably at least 20 wt %, of compounds of the formula (I) in which b is 1 and $R^1$ is hydrogen. This embodiment of the invention, without metal-containing and more particularly without tin-containing catalysts, is particularly preferred.

The adhesion promoters (I) used optionally in the coating compositions (BS) of the invention may be any desired adhesion promoters described to date for systems which cure by silane condensation.

Examples of adhesion promoters (I) are epoxysilanes, such as glycidyloxypropyltrimethoxysilanes, glycidyloxypropylmethyldimethoxysilane, glycidyloxypropyltriethoxysilane or glycidyloxypropylmethyldiethoxysilane, 2-(3-triethoxysilylpropyl)maleic anhydride, N-(3-trimethoxysilylpropyl)urea, N-(3-triethoxysilylpropyl)urea, N-(trimethoxysilylmethyl)urea, N-(methyldimethoxysilylmethyl)urea, N-(3-trimethoxysilylmethyl)urea, N-(3-methyldiethoxysilylmethyl)urea, O-methylcarbamatomethylmethyldimethoxysilane, O-methylcarbamatomethyltrimethoxysilane, O-ethylcarbamatomethylmethyldiethoxysilane, O-ethylcarbamatomethyltriethoxysilane, 3-methacryloyloxypropyltrimethoxysilane, methacryloyloxymethyltrimethoxysilane, methacryloyloxymethylmethyldimethoxysilane, methacryloyloxymethyltriethoxysilane, methacryloyloxymethylmethyldiethoxysilane, 3-acryloyloxypropyltrimethoxysilane, acryloyloxymethyltrimethoxysilane, acryloyloxymethylmethyldimethoxysilanes, acryloyloxymethyltriethoxysilane and acryloyloxymethylmethyldiethoxysilane and also their partial condensates.

If the coating compositions (BS) of the invention do include adhesion promoters (I), the amounts are preferably 0.5 to 30 parts by weight, more preferably 1 to 10 parts by weight, based in each case on 100 parts by weight of coating compositions (BS).

The water scavengers (J) optionally used in the coating compositions (BS) of the invention may be any desired water scavengers described for systems which cure by silane condensation.

Examples of water scavengers (J) are silanes such as vinyltrimethoxysilane, vinyltriethoxysilane, vinylmethyldimethoxysilane, phenyltrimethoxysilane, phenyltriethoxysilane, phenylmethyldimethoxysilane, O-methylcarbamatomethylmethydimethoxysilane, O-methylcarbamatomethyltrimethoxysilane, O-ethylcarbamatomethylmethyldiethoxysilane, O-ethylcarbamatomethyltriethoxysilane, and/or their partial condensates, and also orthoesters, such as 1,1,1-trimethoxyethane, 1,1,1-triethoxyethane, trimethoxymethane and triethoxymethane.

If the coating compositions (BS) of the invention do include water scavengers (J), the amounts are preferably 0.5 to 30 parts by weight, more preferably 1 to 10 parts by weight, based in each case on 100 parts by weight of coating compositions (BS). The coating compositions (BS) of the invention preferably do comprise water scavengers (J).

The additives (K) optionally used in the coating compositions (BS) of the invention may be any desired additives known to date and typical of silane-crosslinking systems.

The additives (K) optionally used in the invention are preferably antioxidants, UV absorbers, fungicides, and pigments.

Particularly preferred for use as additives (K) are UV absorbers, since in combination with component (B) of the invention they lead to additional UV stabilization of the materials of the invention. Examples of UV absorbers are Chimassorb® 82, Chimassorb® 90, Tinuvin© 99, Tinuvin® 101, Tinuvin® 109, Tinuvin® 1130, Tinuvin® 171, Tinuvin® 384, Tinuvin® 900, Tinuvin® 928, Tinuvin® 400, Tinuvin® 405, Tinuvin® 460, Tinuvin® 477, Tinuvin® 471, Tinuvin® 479 or Tinuvin® 400 from BASF SE (Ludwigshafen, DE).

If the coating compositions (BS) of the invention do include additives (K), the amounts are preferably 0.01 to 30 parts by weight, more preferably 0.1 to 20 parts by weight, based in each case on 100 parts by weight of constituent (A).

The coating compositions (BS) of the invention preferably do include additives (K), especially UV absorbers (K).

The adjuvants (L) optionally used in the invention are preferably tetraalkoxysilanes, examples being tetraethoxysilane and/or partial condensates thereof, the latter condensates being particularly preferred; rheological additives, flame retardants, and organic solvents.

The rheological additives (L) are preferably polyamide waxes, hydrogenated castor oils, or stearates.

Examples of organic solvents (L) are the compounds already stated above as solvents (DL), preferably alcohols.

Preferably no organic solvents (L) are added to the coating compositions (BS) of the invention.

If the coating compositions (BS) of the invention do include one or more components (L), the amounts in each case are preferably 0.5 to 200 parts by weight, more preferably 1 to 100 parts by weight, most preferably 2 to 70 parts by weight, based in each case on 100 parts by weight of component (A).

The coating compositions (BS) of the invention are preferably compositions comprising
(A) 100 parts by weight of compounds of the formula (I),
(B) 0.1 to 30 parts by weight of HALS stabilizers,
optionally (C) 10 to 300 parts by weight of one or more reactive diluents,
optionally (D) 25 to 500 parts by weight of silicone resins,
optionally (E) 10 to 300 parts by weight of nonreactive plasticizers,
(F) 0.1 to 25 parts by weight of nitrogen-containing organosilicon compounds,
optionally (G) fillers,
optionally (H) catalysts,
optionally (I) adhesion promoters,
optionally (J) water scavengers,
optionally (K) additives, and
optionally (L) adjuvants,
with the proviso that coating compositions (BS) comprise at least one further component selected from reactive diluents (C), silicone resins (D) and nonreactive plasticizers (E).

The coating compositions (BS) of the invention are more preferably compositions comprising
(A) 100 parts by weight of compounds of the formula (I),
(B) 0.1 to 30 parts by weight of HALS stabilizers,
optionally (C) 10 to 300 parts by weight of one or more reactive diluents,
optionally (D) 25 to 500 parts by weight of silicone resins,
optionally (E) 10 to 300 parts by weight of nonreactive plasticizers,
(F) 0.1 to 25 parts by weight of nitrogen-containing organosilicon compounds,
optionally (G) fillers,
optionally (H) catalysts,
optionally (I) adhesion promoters,
optionally (J) water scavengers,
(K) 0.01 to 30 parts by weight of UV absorbers,
optionally (K) further additives, and
optionally (L) adjuvants,
with the proviso that coating compositions (BS) comprise at least one further component selected from reactive diluents (C), silicone resins (D) and nonreactive plasticizers (E).

The coating compositions (BS) of the invention are more particularly compositions comprising
(A) 100 parts by weight of compounds of the formula (I),
(B) 0.5 to 25 parts by weight of HALS stabilizers,
optionally (C) 25 to 200 parts by weight of one or more reactive diluents,
optionally (D) 50 to 300 parts by weight of silicone resins,
optionally (E) 40 to 250 parts by weight of nonreactive plasticizers,
(F) 0.5 to 15 parts by weight of nitrogen-containing organosilicon compounds,
optionally (G) fillers,
optionally (H) catalysts,
optionally (I) adhesion promoters,
optionally (J) water scavengers,
(K) 0.01 to 20 parts by weight of UV absorbers,
optionally (K) further additives, and
optionally (L) adjuvants, with the proviso that coating compositions (BS) comprise at least one further component selected from reactive diluents (C), silicone resins (D) and nonreactive plasticizers (E).

The coating compositions (BS) of the invention preferably comprise no further constituents apart from components (A) to (L).

The components used in the invention may in each case be one kind of such a component or else a mixture of at least two kinds of a respective component.

The coating compositions (BS) of the invention are preferably one-component materials which are storable with exclusion of water and which are crosslinkable at room temperature on admission of water. The materials of the invention may, however, also be part of two-component crosslinking systems, for which OH-containing compounds, such as water, are added in a second component.

The inventive coating compositions (BS) preferably have at 20° C. a viscosity of at most 20,000 mPas, more preferably of 100 to 10,000 mPas, most preferably of 500 to 5000 mPas.

The inventive coating compositions (BS) preferably exhibit thixotropic behavior, meaning that they have a lower viscosity at higher shear rates than at lower shear rates.

The materials (BS) of the invention may be produced in any desired manner known per se, such as, for instance, by methods and mixing techniques of the kind customary for producing moisture-curing compositions. The sequence in which the various constituents are mixed with one another here may be varied as desired.

A further subject of the present invention is a process for producing the compositions of the invention by mixing the individual components in any order.

This mixing may take place at room temperature and the pressure of the surrounding atmosphere, in other words about 900 to 1100 hPa. If desired, however, this mixing may also take place at higher temperatures, such as at temperatures in the range from 30 to 130° C., for example. It is possible, moreover, to carry out mixing temporarily or continually under reduced pressure, such as at 30 to 500 hPa absolute pressure, for example, in order to remove volatile compounds and/or air.

The mixing according to the invention is accomplished preferably with exclusion of moisture.

The process of the invention may be carried out continuously or discontinuously.

To produce the compositions of the invention, it is also possible for one or more premixes of individual components to be produced and for these premixes then to be mixed with one another.

One particularly advantageous variant of the process of the invention provides initially for the production of a masterbatch (MS), wherein one or more of the generally solid HALS stabilizers (B) are dissolved in a concentration of at least 5 wt %, preferably of at least 10 wt %, more preferably of at least 20 wt %, and most preferably of at least 30 wt %, in one or more liquid components of the coating composition (BS). For the actual production of the coating composition (BS), this liquid masterbatch (MS) is then used in place of the solid HALS stabilizer (B).

Serving as suitable components for dissolving the HALS stabilizers (B) may be components (C), (D), (E), (F), (I), (J)

or (L), with components (C), (D), (E) and (J) being preferred and component (J) being particularly preferred.

The masterbatch mixture (MS) is preferably a solution of one or more HALS stabilizers (B) in vinyl- or phenyltrimethoxysilane or vinyl- or phenyltriethoxysilane, more particularly a solution in vinyltrimethoxysilane.

In one particularly advantageous configuration, UV absorbers and/or an antioxidant (K) as well are additionally added to the masterbatch mixture (MS). This has the advantage, for the manufacturer of the coating composition (BS) of the invention, that with the masterbatch (MS) there is only a single component to be added in order to achieve optimum weathering resistance.

A production process for the coating composition (BS) using a masterbatch mixture (MS) is likewise a subject of the invention.

The compositions of the invention or produced in the invention are outstandingly suitable for the coating of surfaces, preferably for the sealing of surfaces in the exterior of buildings, more particularly of flat roofs, against the penetration of water.

A further subject of the invention is a process for coating surfaces by applying the coating composition (BS) of the invention or produced in the invention to the surface to be coated, preferably for coating surfaces in the exterior of buildings, more particularly for coating flat roofs.

In this context, the coating compositions (BS) of the invention may be applied to the surfaces to be coated, and may be allowed to cure, in any desired way known to date. Application according to the invention in this case is accomplished preferably by means of brush, roller, doctor or commercial spraying equipment such as airless equipment.

The coating compositions (BS) of the invention here are preferably applied in a layer thickness of 0.1 mm to 50 mm, more preferably in a layer thickness of 0.2 mm to 20 mm, most preferably in a layer thickness of 0.3 mm to 10 mm to the surface to be coated.

Preferred examples of surfaces to which the coating compositions (BS) of the invention may be applied are mineral building materials such as stones or concrete, metals, roofing felts, plastics, woven fiber fabric, wood, glass, or ceramic. The coating compositions (BS) of the invention exhibit preferably thixotropic behavior and may be applied both to horizontal and to vertical areas.

The usual water content of the air is sufficient for the crosslinking of the coating compositions (BS) of the invention. The materials of the invention are crosslinked preferably at room temperature. Crosslinking may, if desired, also be carried out at temperatures higher or lower than room temperature, such as at −5° to 15° C. or at 30° to 50° C., for example, and/or by means of water concentrations exceeding the standard water content of the air.

The crosslinking is carried out preferably at a pressure of 100 to 1100 hPa, more particularly at the pressure of the surrounding atmosphere, in other words about 900 to 1100 hPa.

A further subject are shaped articles produced by crosslinking the compositions (BS) of the invention or produced in the invention.

The shaped articles of the invention are preferably coatings.

The compositions of the invention have the advantage that they are easy to produce.

The crosslinkable compositions of the invention have the advantage that they are distinguished by very high storage stability and a high crosslinking rate.

Additionally, the crosslinkable compositions of the invention have the advantage that they have an excellent adhesion profile and an outstanding elasticity. They are notable, moreover, for good recoatability.

Additionally, the crosslinkable compositions of the invention have the advantage that they are of low viscosity and hence can be processed easily even in the solvent-free state.

The compositions of the invention have the advantage, furthermore, that coatings obtained from them are very stable to weathering. While conventional HALS stabilizers are gradually washed out by rainwater under weathering, the stabilizers of the coatings of the invention, in contrast, are surprisingly retained in the coating to much greater extents even under weathering.

In the examples described below, all viscosity figures relate to a temperature of 25° C. Unless otherwise indicated, the examples below are carried out at a pressure of the surrounding atmosphere, in other words approximately at 1000 hPa, and at room temperature, in other words at about 23° C., or at a temperature which comes about when the reactants are combined at room temperature without additional heating or cooling, and also at a relative atmospheric humidity of about 50%. Furthermore, all figures for parts and percentages, unless otherwise indicated, relate to the weight.

EXAMPLES

Stabilizers Used: Monomeric or Dimeric HALS Stabilizers:
Tinuvin® 123: Bis(2,2,6,6-tetramethyl-1-(octyloxy)-4-piperidinyl)-decanedioic ester; CAS No.: 129757-67-1; available commercially from BASF SE (Ludwigshafen, DE)
Tinuvin® 152: 2,4-Bis[N-butyl-N-(1-cyclohexyloxy-2,2,6,6-tetramethylpiperidin-4-yl)amino]-6-(2-hydroxyethylamine)-1,3,5-triazine; CAS No.: 191743-75-6; available commercially from BASF SE (Ludwigshafen, DE)
Tinuvin® 765: Mixture of Bis(1,2,2,6,6-pentamethyl-4-piperidyl) sebacate and methyl 1,2,2,6,6-pentamethyl-4-piperidylsebacate; CAS Nos.: 41556-26-7 and 82919-37-7; available commercially from BASF SE (Ludwigshafen, DE)
Dimeric HALS Stabilizers with a 2,6-Di-t-Butylphenol Structure:
Tinuvin® 144: Bis(1,2,2,6,6-pentamethyl-4-piperidinyl)-[[3,5-bis-(1,1-dimethylethyl)-4-hydroxyphenyl]methyl]-butylmalonate; CAS No.: 63843-89-0; available commercially from BASF SE (Ludwigshafen, DE)
Oligomeric HALS Stabilizers:
Chimassorb® 944: Poly[[6-[(1,1,3,3-tetramethylbutyl)amino]-1,3,5-triazine-2,4-diyl][(2,2,6,6-tetramethyl-4-piperidinyl)imino]-1,6-hexanediyl-[(2,2,6,6-tetramethyl-4-piperidinyl)imino]]; CAS Nos.: 71878-19-8; 70624-18-9 (US); available commercially from BASF SE (Ludwigshafen, DE)
Chimassorb® 2020: Reaction product of N,N'-bis(2,2,6,6-tetramethyl-4-piperidinyl)-1,6-hexanediamine with 2,4,6-trichloro-1,3,5-triazine and N-butyl-1-butanamine and N-butyl-2,2,6,6-tetramethyl-4-piperidinamine; CAS No.: 192268-64-7; available commercially from BASF SE (Ludwigshafen, DE)
UV Absorber:
Tinuvin® 400: 2-Hydroxyphenyl-s-triazine derivative (CAS No.: 107-98-2), 85% in 1-methoxypropan-2-ol; available commercially from BASF SE (Ludwigshafen, DE)

Example 1

Production of a HALS Masterbatch Solution

A 500 ml flask with stirrer is charged with 80 g of vinyltrimethoxysilane, 80 g of Chimassorb© 2020 are added, and the mixture is stirred for 15 minutes to form a homogeneous, slightly opaque solution. Then 40 g of Tinuvin® 400 are metered in and stirring takes place for a further 30 minutes. The finished solution is clear, slightly yellowish, and has a Brookfield viscosity of 350-450 mPas.

Example 2a: Production of a 1K Coating Formulation 168.3 g of silane-terminated polypropylene glycol having an average molar mass (Mn) of 12 000 g/mol and end groups of the formula —O—C(=O)—NH—CH$_2$—SiCH$_3$(OCH$_3$)$_2$ (available commercially under the name GENIOSIL® STP-E10 from Wacker Chemie AG, Munich, DE), 84.1 g of silane-terminated polypropylene glycol having an average molar mass (Mn) of 12 000 daltons and end groups of the formula —O—C(=O)—NH—(CH$_2$)$_3$—Si(OCH$_3$)$_3$ (available commercially under the name GENIOSIL® STP-E15 from Wacker Chemie AG, Munich, DE) and 192.4 g of hexadecyltrimethoxysilane are homogenized in a laboratory planetary mixer from PC-Laborsystem, equipped with two beam-type mixers, at around 25° C. with 4.2 g of methylcarbamatomethyl-methyldimethoxysilane, 20.0 g of vinyltrimethoxysilane and 20 g of Chimassorb® 2020 for 2 minutes at 200 rpm. Then 119.0 g of aluminum trihydroxide having a BET surface area of 3-5 m$^2$/g and a d50 of 1.7-2.1 μm (available commercially under the name "Martinal® OL 104" from Albemarle Corp.), 370.0 g of chalk having a BET surface area of 3 m$^2$/g and a d50 of 0.45 μm (commercialized under the name "Imerseal® 50" by Imerys) and 15 g of fumed silica having a BET surface area of around 200 m$^2$/g and a surface modified with trimethylsiloxy groups (available commercially as HDK® H2000 from Wacker Chemie AG, Munich, DE) are digested with stirring at 600 rpm for one minute. Thereafter 7.0 g of 3-aminopropyltrimethoxysilane are mixed in at 200 rpm for 1 minute. Lastly, stirring for homogenization and removal of bubbles is carried out for 2 minutes at 600 rpm and for 1 minute at 200 rpm at the pressure of 100 mbar.

The result is a sealant having a viscosity of 19,500 mPas (Brookfield, spindle 6, 5.0 min$^{-1}$) or 5200 mPas (Brookfield, spindle 6, 50 min$^{-1}$).

Example 2b: Production of a 1K Coating Formulation

The same procedure is followed as described in example 2a, but replacing the Chimassorb® 2020 with an identical amount of Chimassorb® 944.

Example 2c: Production of a 1K Coating Formulation

The same procedure is followed as described in example 2a, but replacing the 20 g of Chimassorb® 2020 and the vinyltrimethoxysilane with 50 g of the masterbatch solution produced in example 1. This masterbatch solution likewise contains 20 g of Chimassorb® 2020, but relative to the pure stabilizer has the advantages of being liquid and additionally of containing, with the Tinuvin® 400, a further 10 g of a UV absorber.

Example 2d: Production of a 1K Coating Formulation

The same procedure is followed as described in example 2a, but replacing the Chimassorb® 2020 with an identical amount of Tinuvin® 144.

Comparative Examples C2e to C2g: Production of a 1K Coating Formulation

The same procedure is followed as described in example 2a, but replacing the Chimassorb® 2020 with an identical amount of the following monomeric or dimeric HALS stabilizer:
Example C2e: Tinuvin® 152
Example C2f: Tinuvin® 765
Example C2g: Tinuvin® 123

Example 3a: Determination of Skin Times and Mechanical Properties

Skin Time (SKT)

For determination of the skin time, the coating formulations obtained in examples 2a to 2d and C2e to C2g are applied in a layer 2 mm thick to PE film and stored under standard conditions (23° C. and 50% relative humidity). During the curing process, testing takes place every 5 minutes for formation of a skin. For this purpose, a dry laboratory spatula is placed carefully onto the surface of the sample and pulled upward. If sample sticks to the finger, a skin has not yet formed. If sample no longer sticks to the finger, a skin has formed. The corresponding time is reported in table 1.

Mechanical Properties of the Cured Coatings

The coating formulations of examples 2a to 2d and C2e to C2g are each coated out onto milled-out Teflon plaques with a depth of 2 mm and cured for 2 weeks at 23° C. and a relative humidity of 50%.

Shore A hardness is determined according to DIN 53505.
Tensile strength is determined according to DIN 53504-S1.
Elongation at break is determined according to DIN 53504-S1.

The corresponding results are reported in table 1.

TABLE 1

| Example | 2a | 2b | 2c | 2d | C2e | C2f | C2g |
|---|---|---|---|---|---|---|---|
| Skin time [min] | 35 | 34 | 35 | 33 | 36 | 36 | 34 |
| Shore A hardness | 68 | 67 | 67 | 69 | 66 | 69 | 68 |
| Tensile strength [N/mm$^2$] | 2.3 | 2.3 | 2.2 | 2.4 | 2.3 | 2.3 | 2.2 |
| Elongation at break [%] | 250 | 245 | 251 | 254 | 248 | 250 | 252 |

Example 3b: Weathering Test

Films 0.5 mm thick in a size of 45 times 45 mm are produced from each of the coating formulations of examples 2a to 2d and C2e to C2g, by knife-coating the respective formulation on a PE film, using a 550 μm doctor, and then allowing it to cure for 2 weeks at 23° C. and relative humidity of 50%.

The ready-cured films are detached from the PE film, and an area of 35 times 45 mm is weathered in an Atlas Xenotest Beta LM. Weathering takes place in accordance with the DIN EN ISO 11341 standard and simulates outdoor weathering. In each cycle, 12 minutes of rain alternate with 108 minutes of dry weathering. The irradiation spectrum corresponds largely to that of sunlight, and UV radiation has an intensity of around 60 W/mm$^2$. A humidity of 40-60% and a temperature of 38° C. prevail in the Xenotester. The results obtained in this test are those in table 2.

The numerical values reported in table 2 correspond to the day of weathering on which the event reported in the first column was observed for the first time.

TABLE 2

| Example | 2a | 2b | 2c | 2d | C2e | C2f | C2g |
|---|---|---|---|---|---|---|---|
| Stabilizer used | Chi. 2020 | Chi. 994 | Chi. 2020 | Tin 144 | Tin. 152 | Tin. 765 | Tin. 123 |
| Isolated liquid areas | >200 | >200 | >200 | 44 | 6 | 23 | 7 |
| Film completely decomposed | >200 | >200 | >200 | 58 | 16 | 28 | 12 |

The formulations from examples 2a to 2c were unchanged after 200 days. Even after 250 days, the particularly preferred formulations from examples 2a and 2b still showed no liquid areas, but had become somewhat softer. The particularly preferred formulation from example 2c was still entirely unchanged even after 250 days.

Example 4a: Production of a 1K Coating Formulation 132.4 g of GENIOSIL® STP-E10, 66.2 g of GENIOSIL® STP-E15 and 246.4 g of diisononyl cyclohexane-1,2-dicarboxylate (available commercially under the name "Hexamoll DINCH" from BASF SE; Ludwigshafen, DE) are homogenized in a laboratory planetary mixer from PC-Laborsystem, equipped with two beam-type stirrers, at around 25° C. with 5.0 g of methylcarba-matomethyl-methyldimethoxysilane, 19 g of vinyltrimethoxysilane and 20 g of Chimassorb® 2020 at 200 rpm for 2 minutes. Then 489.0 g of Imerseal 50 and 15 g of HDK® are digested with stirring at 600 rpm for one minute. Thereafter 7.0 g of 3-aminopropyltrimethoxysilane are mixed in at 200 rpm for 1 minute. Lastly, stirring for homogenization and removal of bubbles takes place for 2 minutes at 600 rpm and for 1 minute at 200 rpm at the pressure of 100 mbar.

The product is a sealant having a viscosity of 14 200 mPas (Brookfield, spindle 6, 5.0 min$^{-1}$) and 5400 mPas (Brookfield, spindle 6, 50 min$^{-1}$).

Example 4b: Production of a 1K Coating Formulation

The same procedure is followed as described in example 4a, but replacing the Chimassorb® 2020 with an identical amount of Chimassorb® 944.

Example 4c: Production of a 1K Coating Formulation

The same procedure is followed as described in example 4a, but replacing the 20 g of Chimassorb® 2020 and the vinyltrimethoxysilane with 50 g of the masterbatch solution produced in example 1. This masterbatch solution likewise contains 20 g of Chimassorb® 2020, but relative to the pure stabilizer has the advantages of being liquid and additionally of containing, with the Tinuvin® 400, a further 10 g of a UV absorber.

Comparative Examples C4d to C4f: Production of 1K Coating Formulation

The same procedure is followed as described in example 4a, but replacing the Chimassorb® 2020 with an identical amount of the following monomeric or dimeric HALS stabilizer:
Example C4d: Tinuvin® 152
Example C4e: Tinuvin® 765
Example C4f: Tinuvin® 123.

Example 5a: Determination of Skin Times and Mechanical Properties

Skin time and mechanical properties were determined as described in example 3a. The corresponding results are reported in table 3.

TABLE 3

| Example | 4a | 4b | 4c | C4d | C4e | C4f |
|---|---|---|---|---|---|---|
| Skin time [min] | 35 | 33 | 36 | 34 | 35 | 36 |
| Shore A hardness | 30 | 29 | 29 | 31 | 29 | 30 |
| Tensile strength [N/mm$^2$] | 1.2 | 1.2 | 1.3 | 1.1 | 1.2 | 1.1 |
| Elongation at break [%] | 405 | 418 | 398 | 396 | 411 | 399 |

Example 5b: Weathering Test

Films 0.5 mm thick in a size of 45 times 45 mm are produced from each of the coating formulations of examples 4a to 4c and C4d to C4f, by knife-coating the respective formulation on a PE film, using a 550 μm doctor, and then allowing it to cure for 2 weeks at 23° C. and relative humidity of 50%.

The ready-cured films are detached from the PE film and weathered in an Atlas Xenotest Beta LM as described in example 3. The results obtained in this test are those in table 4.

The numerical values reported in table 4 correspond to the day of weathering on which the event reported in the first column was observed for the first time.

TABLE 4

| Example | 4a | 4b | 4c | C4d | C4e | C4f |
|---|---|---|---|---|---|---|
| Stabilizer used | Chim. 2020 | Chim. 994 | Chim. 2020 | Tin. 152 | Tin. 765 | Tin. 123 |
| Isolated liquid areas | >200 | >200 | >200 | 7 | 18 | 8 |
| Film completely decomposed | >200 | >200 | >200 | 25 | 25 | 12 |

The formulations from examples 4a to 4c were unchanged after 200 days. Even after 250 days, the particularly preferred formulations from examples 4a and 4b still showed no liquid areas, but had become somewhat softer. The particularly preferred formulation from example 4c was still entirely unchanged even after 250 days.

The invention claimed is:
1. A moisture-curing coating composition (BS), comprising components
(A) at least one compound of the formula

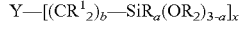

where
Y denotes an x-valent polymer radical bonded via nitrogen, oxygen, sulfur or carbon,
R are identical or different and represent a monovalent, optionally substituted, SiC-bonded hydrocarbon radical,
$R^1$ are identical or different and represent hydrogen or a monovalent, optionally substituted hydrocarbon radical which may be attached to the carbon atom via nitrogen, phosphorus, oxygen, sulfur, or carbonyl group,
$R^2$ are identical or different and denote hydrogen or a monovalent, optionally substituted hydrocarbon radical,
x is an integer from 1 to 10,
a are identical or different and is 0, 1 or 2, and
b are identical or different and is an integer from 1 to 10,
(B) one or more HALS stabilizers, which are selected from
(B1) mixtures of different organic compounds which per molecule have at least one functional group of the formula

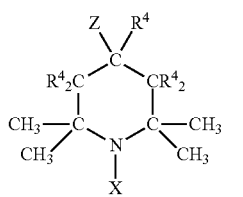

(II)

with the proviso that the organic compounds contained in this mixture contain per molecule on average more than two functional groups of the formula (II),
(B2) organic compounds having at least three functional groups of the formula (II), and
(B3) organic compounds having at least three functional groups selected from functional groups of the formula (II) and optionally substituted hydroxyphenyl groups,
where
X represents an N-bonded, monovalent radical $R^3$, a radical —$OR^3$ or a radical —$C(=O)R^3$ or a chemical bond to further structural elements of the stabilizer molecule,
Z represents hydrogen, a radical —$OR^{13}$ or a group $NR^{13}{}_2$,
$R^3$ are identical or different and represents hydrogen or a monovalent, optionally substituted hydrocarbon radical optionally interrupted by oxygen atoms, ester groups or amine groups,
$R^{13}$ are identical or different and has a definition as indicated for $R^3$ or represents a chemical bond to further structural elements of the stabilizer molecule, and
$R^4$ are identical or different and represents a hydrogen atom or a monovalent, optionally substituted hydrocarbon radical,
with the proviso that at least one of the radicals X or $R^{13}$ in formula (II) represents a chemical bond to further structural elements of the stabilizer molecule.

2. The coating composition of claim 1, wherein stabilizer (B) comprises mixtures (B1) or organic compounds (B2).

3. The coating composition of claim 1, further comprising at least one further component selected from reactive diluents (C), silicone resins (D), and nonreactive plasticizers (E).

4. The coating composition of claim 1, further comprising at least one further component selected from reactive diluents (C) and silicone resins (D).

5. The coating composition of claim 1, further comprising a reactive diluent (C).

6. A process for producing a composition of claim 1, comprising mixing the components in any order.

7. The process of claim 6, wherein a masterbatch (MS) is produced wherein one or more HALS stabilizers (B) are dissolved in a concentration of at least 5 wt % in one or more liquid components of the coating composition (BS).

8. A process for coating a surface, comprising applying a coating composition (BS) of claim 1 to the surface.

9. The process of claim 8, wherein the surface to which the coating composition (BS) is applied is a mineral building material surface.

10. The process of claim 8, wherein the surface to which the coating composition (BS) is applied is a stone or concrete, metal, roofing felt, plastic, woven fiber fabric, wood, glass or ceramic surface.

11. The process of claim 8, wherein the coating composition (BS) is applied in a layer thickness of 0.1 mm to 50 mm to the surface.

12. The process of claim 8, wherein a surface of an exterior of a building is coated.

13. A shaped article produced by crosslinking the composition (BS) of claim 1.

14. The shaped article of claim 13, which is a coating.

* * * * *